(12) United States Patent
Takaoka (10) Patent No.: US 10,536,575 B2
(45) Date of Patent: Jan. 14, 2020

(54) COMMUNICATION DEVICE (71) Applicant: KYOCERA Document Solutions Inc., Osaka (JP)

(72) Inventor: Toshimasa Takaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/198,164

(22) Filed: Nov. 21, 2018

(65) Prior Publication Data

US 2019/0166248 A1 May 30, 2019

(30) Foreign Application Priority Data

Nov. 29, 2017 (JP) ................. 2017-228750

(51) Int. Cl.
*H04M 1/725* (2006.01)
*H04W 4/021* (2018.01)
*H04N 7/18* (2006.01)

(52) U.S. Cl.
CPC ... *H04M 1/72577* (2013.01); *H04M 1/72569* (2013.01); *H04M 1/72572* (2013.01); *H04N 7/185* (2013.01); *H04N 7/188* (2013.01); *H04W 4/021* (2013.01)

(58) Field of Classification Search
CPC ......... H04M 1/72577; H04M 1/72572; H04M 1/72569; H04W 4/029; H04W 4/021; H04W 4/022; G01S 5/0027; G01S 19/16; G08B 13/1427; G08B 13/1436; G08B 21/0269; G08B 21/0261; H04N 7/185; H04N 7/188

USPC ................................................. 455/456.1
See application file for complete search history.

(56) References Cited

U.S. PATENT DOCUMENTS

| | | | | |
|---|---|---|---|---|
| 6,782,266 | B2 * | 8/2004 | Baer ................. | H04B 7/18506 455/421 |
| 6,973,323 | B2 * | 12/2005 | Oesterling .......... | H04L 12/2854 455/456.4 |
| 7,212,829 | B1 * | 5/2007 | Lau ...................... | G06Q 10/00 455/456.1 |
| 7,272,403 | B2 * | 9/2007 | Creamer ............... | H04W 4/029 455/456.1 |
| 9,304,207 | B2 * | 4/2016 | Shingyoji ........... | G01C 21/165 |
| 9,516,284 | B2 * | 12/2016 | Carter ................. | H04M 11/025 |
| 2005/0071081 | A1 * | 3/2005 | Hirose ................. | G01C 21/20 701/414 |
| 2005/0192741 | A1 | 9/2005 | Nichols et al. ............... | 701/207 |
| 2012/0309432 | A1 * | 12/2012 | Gu ........................ | G06F 21/88 455/456.6 |

(Continued)

FOREIGN PATENT DOCUMENTS

JP 2009-296112 A 12/2009

*Primary Examiner* — William Nealon
(74) *Attorney, Agent, or Firm* — Stein IP, LLC (57) ABSTRACT

A communication device has a storage, a GPS receiver, a communicator, and a controller. The storage stores a planned travel route. The GPS receiver receives GPS signals. The communicator communicates with the outside. The controller sets an area including the planned travel route as a target area, and when an out-of-area state has begun in which the location of the communication device falls outside the target area, transmits information indicating the location of the communication device as observed when the out-of-area state began to a previously registered transmission destination.

4 Claims, 4 Drawing Sheets

(56) References Cited

U.S. PATENT DOCUMENTS

| | | | | |
|---|---|---|---|---|
| 2014/0278044 A1* | 9/2014 | Jacobs | ............... | H04W 4/40 |
| | | | | 701/300 |
| 2016/0155310 A1* | 6/2016 | Joao | ............... | G06F 16/29 |
| | | | | 340/573.1 |
| 2018/0041983 A1* | 2/2018 | Mulaosmanovic | ... | H04W 64/00 |
| 2018/0068567 A1* | 3/2018 | Gong | ............... | H04W 4/022 |

* cited by examiner

COMMUNICATION DEVICE

INCORPORATION BY REFERENCE

This application is based on and claims the benefit of Japanese Patent Application No. 2017-228750 filed on Nov. 29, 2017, the contents of which are hereby incorporated by reference.

BACKGROUND

The present disclosure relates to a communication device that can communicate with the outside.

There are conventionally known communication devices, such as smartphones and tablet computers, that their users can carry around. These communication devices are compact, and are easy to lose. For example, they are often left behind in railroad vehicles and in buses.

For example, if a communication device passes into the hands of a stranger, there may arise an inconvenience of unauthorized use by the stranger. For this reason, some communication devices are furnished with a function for preventing unauthorized use by a stranger.

Such a conventional communication device, when operated, shoots the operator with a camera and performs face authentication and password authentication. Unless the face authentication and password authentication verify the operator as the legitimate owner of the communication device, it enters a locked state (a state in which it does not accept any operation by the operator). That is, when the stranger operates the communication device, it enters the locked state. This helps prevent unauthorized use of the communication device by the stranger.

SUMMARY

According to one aspect of the present disclosure, a communication device is provided with a storage, a GPS receiver, a communicator, and a controller. The storage stores a search application for using a search service for searching for a route from a place of departure to a destination, and also stores a planned travel route searched for and confirmed by a user using the search application. The GPS receiver receives GPS signals. The communicator communicates with the outside. The controller sets an area including the planned travel route as a target area, performs monitoring processing for determining whether an out-of-area state has begun in which the location of the communication device as recognized based on the GPS signal falls outside the target area, and, when the out-of-area state has begun, transmits monitoring information including information indicating the location of the communication device as observed when the out-of-area state began via the communicator to a transmission destination previously registered by the user.

DETAILED DESCRIPTION

Hereinafter, a configuration of a communication device according to one embodiment of the present disclosure will be described. The communication device 100 of this embodiment is a smartphone or a tablet computer. It should be noted that the present disclosure is applicable to portable communication devices in general that their users can carry with them into railroad vehicles and automobiles (such as buses).

Figure 1:
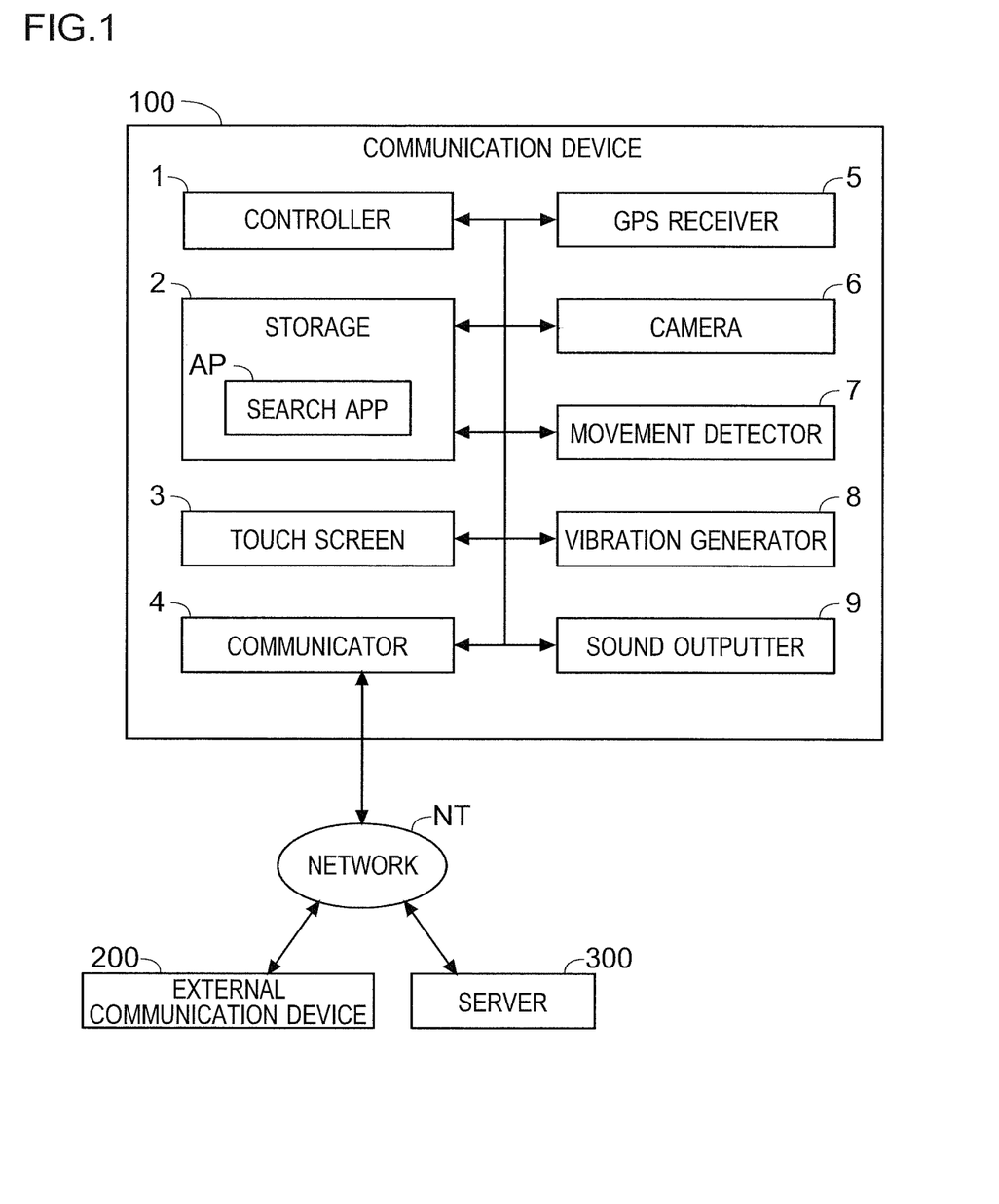
FIG. 1 is a diagram showing a configuration of a communication device according to one embodiment of the present disclosure.

Configuration of Communication Device:

As shown in FIG. 1, the communication device 100 of this embodiment is provided with a controller 1. The controller 1 includes a processing circuit such as a CPU. The controller 1 performs processing for controlling different blocks in the communication device 100 based on programs for control and data for control.

The communication device 100 is provided also with a storage 2. The storage 2 includes a non-volatile memory (ROM) and a volatile memory (RAM). The storage 2 is connected to the controller 1. The programs for control and the data for control are stored in the storage 2.

The communication device 100 is provided also with a touch screen 3. The touch screen 3 includes a liquid crystal display panel and a touch panel. The touch panel is a multi-touch panel, and is provided on the surface of the liquid crystal display panel. The controller 1 controls the display operation by the touch screen 3, and senses touch operations on the touch screen 3.

The touch screen 3 displays a screen, and accepts touch operations on the displayed screen (touch operations on software buttons shown on the screen) from a user. For example, the touch screen 3 displays notification messages, which will be described later. In the configuration under discussion, the touch screen 3 corresponds to a "notifier".

The communication device 100 is provided also with a communicator 4. The communicator 4 is a communication interface that connects the communication device 100 communicably to an external communication device 200, and includes a circuit for communication, a memory for communication, and the like. The controller 1 accesses, via the communicator 4, a network NT such as the Internet, and communicates with the external communication device 200, which is connected to the network NT. The external communication device 200 connected to the network NT can be a transmission destination of monitoring information, which will be described later. For example, in a case where the user of the communication device 100 owns a personal computer (PC), the PC can be connected to the network NT.

Also connected to the network NT is a server 300. The server 300 is administered by a search service provider that provides services for the search of routes from a place of departure to a destination.

The communication device 100 is provided also with a GPS receiver 5. The GPS receiver 5 includes a GPS antenna. The GPS receiver 5 receives GPS signals emitted from GPS satellites. Based on the GPS signals received by the GPS receiver 5, the controller 1 recognizes the current location (degrees of latitude and longitude) of the communication device 100.

The communication device 100 is provided also with a camera 6. The camera 6 includes an imaging device, a lens, and the like. Used as the imaging device is a CMOS camera or a CCD camera. The controller 1 controls the shooting by the camera 6, and acquires image data shot by the camera 6.

The communication device 100 is provided also with a movement detector 7. Usable as the movement detector 7 is an acceleration sensor, a gyro sensor, or a combination of an acceleration sensor and a gyro sensor. Based on the output of the movement detector 7, the controller 1 determines whether the communication device 100 has been moved (whether how the communication device 100 lies has changed).

The communication device 100 is provided also with a vibration generator 8. The vibration generator 8 includes a vibrating motor. Driving the vibration generator 8 (vibrating motor) causes the communication device 100 to vibrate. The controller 1 controls the driving of the vibration generator 8. For example, when giving the user a notification, the controller 1 makes the vibration generator 8 vibrate and makes the communication device 100 vibrate. In the configuration under discussion, the vibration generator 8 corresponds to a "notifier".

The communication device 100 is provided also with a sound outputter 9. The sound outputter 9 includes a loudspeaker. The controller 1 performs processing to make the sound outputter 9 output sound. For example, when giving the user a notification, the controller 1 makes the sound outputter 9 output prescribed notifying sound. In the configuration under discussion, the sound outputter 9 corresponds to a "notifier".

Route Search:

The communication device 100 has a search application AP (hereinafter abbreviated to "search app AP") installed on it. The search app AP is stored in the storage 2 (see FIG. 1). The search app AP is an application software program that allows the use of search services. For example, using the search app AP allows searches for railroad routes from a place of departure (railroad station) to a destination (railroad station). The search app AP may be furnished with a function for searching automobile routes from a place of departure to a destination.

When the touch screen 3 accepts an operation for instructing to start up the search app AP (for example, a touch operation on an icon of the search app AP), the controller 1 makes the touch screen 3 display a search accepting screen (unillustrated). On the search accepting screen, operations for entering a place of departure and a destination are accepted.

When a place of departure and a destination are entered on the search accepting screen, the controller 1 makes the communicator 4 transmit search option information indicating the entered place of departure and destination to the server 300. On receiving the search option information, the server 300 performs processing for searching for a route from the place of departure to the destination based on the search option information. The server 300 then returns search result information indicating search results to the communication device 100. The search result information typically includes a plurality of routes.

The controller 1 makes the touch screen 3 display the plurality of routes indicated by the search result information received by the communicator 4. With the plurality of routes displayed on the touch screen 3, the user can choose the most convenient route out of the plurality of routes.

Here, having made the touch screen 3 display the plurality of routes, the controller 1 then makes the touch screen 3 accept an operation for confirming the choice of a route. The controller 1 then makes the storage 2 store the route searched for and confirmed by the user as a planned travel route.

Monitoring Function:

The communication device 100 is furnished with a monitoring function. The monitoring function, when enabled, provides the user with monitoring information that assists the user in searching for the communication device 100 when it is lost on the way of the planned travel route.

For example, a setting screen (unillustrated) for the monitoring function is displayed on the touch screen 3. The setting screen for the monitoring function is a screen for accepting operations for instructing whether to enable and disable the monitoring function. When the touch screen 3 accepts an operation for instructing to enable the monitoring function, the controller 1 enables the monitoring function.

With the monitoring function enabled, the controller 1 acquires from a map server map data (hereinafter referred to as "target map data") of an area including the planned travel route. In a case where a plurality of planned travel routes are stored in the storage 2, map data of an area including the planned travel route specified by the user out of those planned travel routes is acquired from the map server. For example, the map data can be distributed from the server 300 administered by the search service provider.

Having acquired the target map data, the controller 1 recognizes the planned travel route (including the place of departure and the destination) on the target map data. The controller 1 then determines whether a starting condition is satisfied that is prescribed as a condition for starting monitoring processing, which is processing related to the monitoring function.

Figure 2:
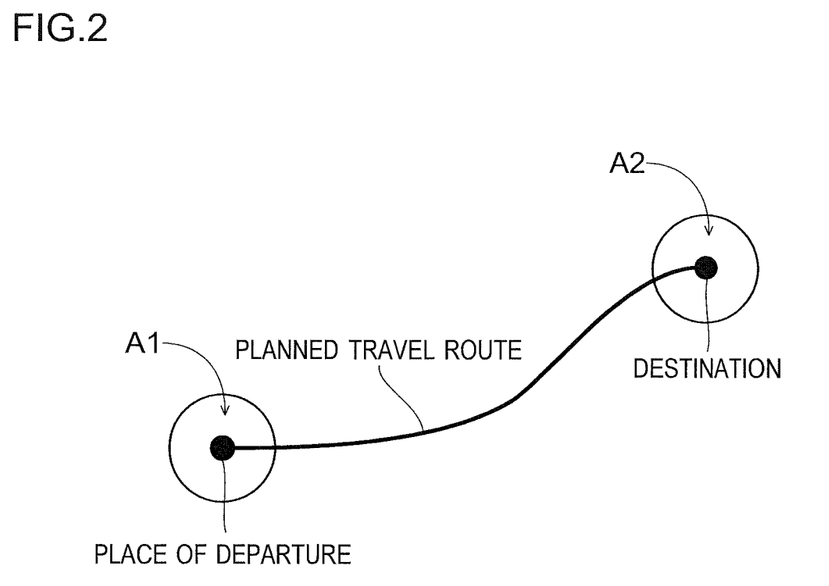
FIG. 2 is a diagram illustrating a target area (a first and a second area) set by a controller in the communication device according to the one embodiment of the present disclosure.

For example, when determining whether the starting condition is satisfied, the controller 1 sets, as a first area A1, an area inside a circle with its center at the place of departure of the planned travel route and with a radius equal to a predetermined distance (see FIG. 2). The controller 1 then recognizes the current location of the communication device 100, and when the so recognized current location of the communication device 100 falls inside the first area A1, the controller 1 determines that the starting condition is satisfied. On determining that the starting condition is satisfied, the controller 1 starts the monitoring processing automatically. The fact that the current location of the communication device 100 falls inside the first area A1 signifies that the user has arrived near the place of departure of the planned travel route (the user is about to start traveling from the place of departure of the planned travel route to the destination).

Instead, even when the current location of the communication device 100 falls inside the first area A1, the controller 1 can, without starting the monitoring processing at the moment, make the touch screen 3 accept an operation for instructing whether to start the monitoring processing. When the touch screen 3 accepts an operation for instructing to start the monitoring processing, the controller 1 determines that the starting condition is satisfied, and starts the monitoring processing.

The controller 1 performs, as part of the monitoring processing, processing for setting a target area based on the position of the planned travel route on the target map data. The controller 1 also performs, as part of the monitoring processing, processing for determining whether an out-of-area state has begun in which the location of the communication device 100 falls outside the target area. Furthermore, when the out-of-area state has begun, the controller 1 performs, as part of the monitoring processing, processing for providing the user with monitoring information.

Figure 3:
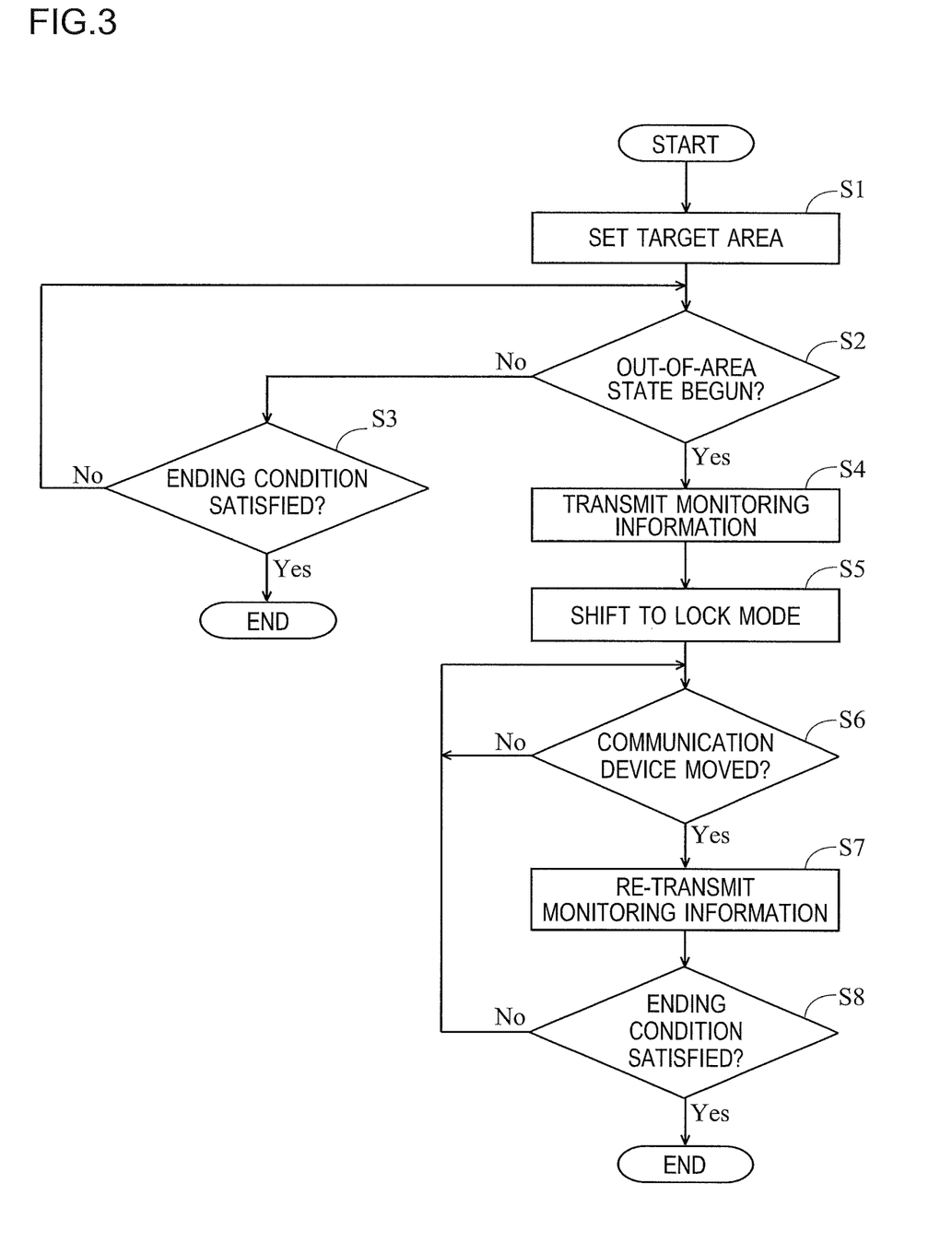
FIG. 3 is a diagram showing a procedure for monitoring processing performed by the controller in the communication device according to the one embodiment of the present disclosure.

Now, with reference to the flow chart in FIG. 3, the procedure of the monitoring processing performed by the controller 1 will be described. The procedure in FIG. 3 starts when the controller 1 determines that the starting condition is satisfied. Throughout the monitoring processing, the controller 1 continues monitoring the current location of the communication device 100 based on the GPS signals received by the GPS receiver 5.

At step S1, the controller 1 recognizes the planned travel route on the target map data, and sets an area including the planned travel route as a target area. There is no particular restriction on how to set the target area.

Figure 4:
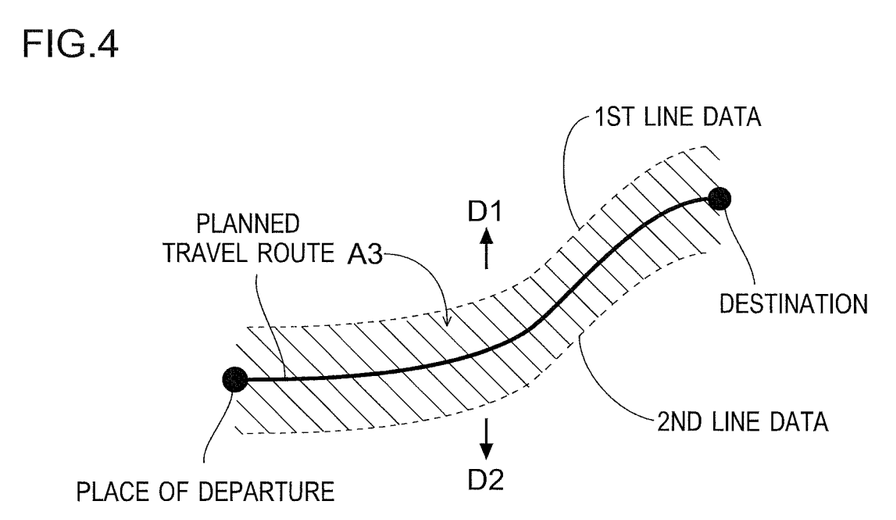
FIG. 4 is a diagram illustrating a target area set by the controller in the communication device according to the one embodiment of the present disclosure.

For example, the controller 1 sets, in addition to the first area A1, a second area A2 (see FIG. 2). Here, set as the second area A2 is an area inside a circle with its center at the destination of the planned travel route and with a radius equal to a predetermined distance (the same distance as the radial distance of the first area A1). Moreover, as shown in FIG. 4, the controller 1 recognizes the position, on the target map data, of first line data (indicated by a broken line) obtained by shifting the planned travel route (indicated by a thick line) by a predetermined distance in one direction (D1 direction), and recognizes the position, on the target map data, of second line data (indicated by a broken line) obtained by shifting the planned travel route by a predetermined distance in another direction (D2 direction) opposite to the one direction. The controller 1 then sets, as a third area A3, the area (indicated by hatching) defined between the first and second line data. The so set third area A3 includes the planned travel route. The controller 1 then sets the first, second, and third areas A1, A2, and A3 as the target area.

Figure 5:
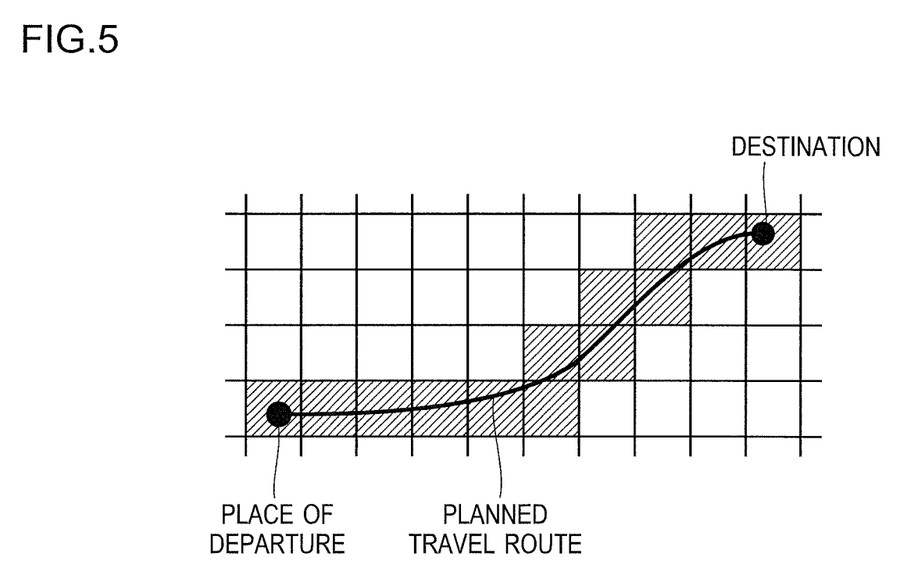
FIG. 5 is a diagram illustrating a target area set by the controller in the communication device according to the one embodiment of the present disclosure.

Instead, as shown in FIG. 5, the controller 1 divides the target map data into a plurality of regions. The controller 1 then sets, in addition to the first and second areas A1 and A2, the area (indicated by hatching) composed of those of the plurality of regions which include in them the planned travel route as the target area.

With reference back to FIG. 3, after the target area is set, an advance is made to step S2. At step S2, the controller 1 determines whether an out-of-area state has begun in which the location of the communication device 100 falls outside the target area. If, as a result, the controller 1 determines that the out-of-area state has not begun, an advance is made step S3.

At step S3, the controller 1 determines whether an ending condition prescribed as a condition for ending the monitoring processing is satisfied. If, as a result, the controller 1 determines that an ending condition is satisfied, the procedure ends; if the controller 1 determines that the ending condition is not satisfied, an advance is made to step S2.

For example, the controller 1 makes the touch screen 3 accept an instruction to end the monitoring processing. Here, the touch screen 3 displays a setting screen (unillustrated) for the monitoring processing. When the touch screen 3 accepts an operation for instructing to disable the monitoring function, the controller 1 makes the touch screen 3 display a password entry screen (unillustrated) for accepting an operation for entering a password.

When a password is entered on the password entry screen, the controller 1 recognizes the entered password. The controller 1 also recognizes a registered password that has previously been registered by the user. The registered password is stored in the storage 2. The controller 1 compares the entered password with the registered password, and if the entered and registered passwords match, the controller 1 determines that the ending condition is satisfied. On determining that the ending condition is satisfied, the controller 1 disables the monitoring processing. Thus, the monitoring processing ends.

If, at step S2, the controller 1 determines that the out-of-area state has begun, an advance is made to step S4. When the out-of-area state has begun, the controller 1 determines that a prescribed locking condition is satisfied.

At step S4, the controller 1 recognizes the transmission destination for the monitoring information. The transmission destination for the monitoring information is previously registered by the user. The transmission destination that has been registered (the registered transmission destination) is stored in the storage 2. A plurality of transmission destinations for the monitoring information may be registered. On recognizing the transmission destination for the monitoring information, the controller 1 makes the communicator 4 transmit the monitoring information to the registered transmission destination.

Here, the controller 1 includes, in the monitoring information, information indicating the location of the communication device 100 as observed when the out-of-area began. Moreover, when the out-of-area state has begun, the controller 1 makes the camera 6 perform shooting. The controller 1 then includes, in the monitoring information, shot data shot by the camera 6 when the out-of-area state began. Only information indicating the location of the communication device 100 as observed when the out-of-area began may be included in the monitoring information. Information indicating the date and time (hour) when the out-of-area state began may be included in the monitoring information.

As a first example, suppose that, while a user is traveling in a railroad vehicle along the planned travel route, the communication device 100 is stolen by a stranger in the railroad vehicle, and the stranger, carrying the communication device 100, gets off the railroad vehicle at a station on the way of the planned travel route. The stranger then probably leaves the station, and thus the out-of-area state begins. Consequently, the controller 1 transmits monitoring information to the registered transmission destination via the communicator 4. The monitoring information includes information indicating the location around the station at which the stranger got off. In this example, based on the monitoring information, the station at which the stranger got off can be identified. If the out-of-area state begins while the stranger is carrying the communication device 100 uncovered, the stranger's features (such as his face and clothes) is shot by the camera 6, and the shot data obtained by the shooting may be included in the monitoring information.

Disabling the monitoring function requires the password, and thus the stranger cannot disable the monitoring function. Accordingly, in the example described above, the monitoring information is transmitted to the registered transmission destination without fail.

As a second example, suppose that the user leaves the communication device 100 behind in a railroad vehicle when getting off at the destination station of the planned travel route. After the user gets off the railroad vehicle at the destination station, the railroad vehicle travels on to the next station, and thus the out-of-area state begins. Consequently, the controller 1 transmits monitoring information to the registered transmission destination via the communicator 4. The monitoring information includes information indicating the location around the destination station. Moreover, depending on how the left-behind communication device 100 (camera 6) lies in the railroad vehicle, a view inside the vehicle is shot, and the shot data of the view inside the vehicle may be included in the monitoring information.

After the monitoring information is transmitted, an advance is made to step S5. At step S5, the controller 1 shifts to a lock mode where it restricts the use of the communication device 100. If having already shifted to the lock mode, the controller 1 continues to remain in the lock mode. When the controller 1 is operating in the lock mode, no voice calls, web browsing, or the like using the communication device 100 can be performed.

When the controller 1 is operating in the lock mode, it determines whether a prescribed unlocking condition is satisfied. The communication device 100 can be unlocked by, without limitation to, password authentication technology or face authentication technology.

For example, when the controller 1 is operating in the lock mode, it makes the touch screen 3 only accept an operation for entering a password. When a password is entered, the controller 1 compares the entered password with a password for unlocking that has previously been registered by the user. If the two passwords match, the controller 1 determines that the unlocking condition is satisfied, and shifts from the lock mode to a normal mode (unlocks the communication device 100). When the controller 1 is operating in the normal mode, the use of the communication device 100 is not limited.

After the shift to the lock mode, an advance is made to step S6. At step S6, based on the output of the movement detector 7, the controller 1 determines whether the communication device 100 has been moved. If, as a result, the controller 1 determines that the communication device 100 has been moved, then an advance is made to Step S7, where, if the controller 1 determines that the communication device 100 has not been moved, the processing at step S6 (the determination by the controller 1) is repeated.

At step S7, the controller 1 makes the communicator 4 transmit (re-transmit) monitoring information to the registered transmission destination. Here, the controller 1 recognizes the location of the communication device 100 as observed when the communication device 100 was moved, and includes information indicating the so recognized location of the communication device 100 in the monitoring information for re-transmission. The controller 1 also makes the camera 6 perform shooting when the communication device 100 has been moved. The controller 1 then includes shot data shot by the camera 6 when the communication device 100 was moved in the monitoring information. Only information indicating the location of the communication device 100 as observed when the communication device 100 was moved may be included in the monitoring information for re-transmission. Information indicating the date and time (hour) at which the communication device 100 was moved may be included in the monitoring information that is retransmitted.

For example, suppose that, in the first example described above, after the first transmission of monitoring information, a stranger has taken out the communication device 100 from a bag or a pocket (has moved the communication device 100). In that case, information indicating the location of the communication device 100 at the moment that the stranger took out the communication device 100 from the bag or the pocket is included in the monitoring information for re-transmission. Moreover, when the stranger has taken out the communication device 100 from the bag or the pocket, shooting by the camera 6 is performed. Then shot data shot by the camera 6 when the stranger took out the communication device 100 from the bag or the pocket is included in the monitoring information.

For another example, suppose that, in the second example described above, after the first transmission of monitoring information, a stranger has picked up the communication device 100 (has moved the communication device 100). In that case, information indicating the location of the communication device 100 at the moment that the stranger picked up the communication device 100 is included in the monitoring information for re-transmission. Moreover, when the stranger has picked up the communication device 100, shooting by camera 6 is performed. Then shot data shot by the camera 6 when the stranger picked up the communication device 100 is included in the monitoring information.

After the monitoring information is re-transmitted, an advance is made to step S8. At step S8, the controller 1 determines whether an ending condition is satisfied. If, as a result, the controller 1 determines that the ending condition is satisfied, the procedure ends; if the controller 1 determines that the ending condition is not satisfied, an advance is made to step S6.

Suppose that the legitimate owner of the communication device 100 (here referred to as the valid user) has picked up (has moved) the communication device 100. At the moment that the valid user has picked up the communication device 100, the communication device 100 is in a locked state, but the valid user can unlock the communication device 100. After the valid user has picked up the communication device 100, he normally disables the monitoring function to stop unnecessary communication (transmission of monitoring information) by the communication device 100. Thus, the monitoring processing by the controller 1 ends.

On the other hand, suppose that a stranger has picked up (has moved) the communication device 100. The stranger does not know the password for unlocking the communication device 100. Thus, the stranger cannot make the communication device 100 display the setting screen for the monitoring function, and therefore the stranger cannot disable the monitoring function. That is, it does not occur that, at step S8 in FIG. 3, the controller 1 ever determines that the ending condition is satisfied. In this case, every time the stranger moves the communication device 100, transmission of monitoring information is repeated. For the person who is searching for the communication device 100, increased information is available that is useful in the search for the communication device 100. It is thus possible to search for the communication device 100 efficiently.

As described above, the communication device 100 of this embodiment is provided with: a storage 2 that stores a search app AP (search application) for using a search service for searching for a route from a place of departure to a destination and that stores a planned travel route searched for and confirmed by a user using the search app AP; a GPS receiver 5 for receiving a GPS signal; a communicator 4 for communication with the outside; and a controller 1 that sets, as a target area, an area including the planned travel route, that performs monitoring processing for determining whether an out-of-area state has begun in which the location of the communication device 100 (own device) as recognized based on the GPS signal falls outside the target area, and that, when the out-of-area state has begun, transmits monitoring information including information indicating the location of the communication device 100 (own device) as observed when the out-of-area state began to a registered transmission destination.

With the configuration of this embodiment, if the communication device 100 of a user passes into the hands of a stranger and is taken away, when the stranger carrying the communication device 100 goes outside the target area (when the out-of-area state begins), regardless of whether or not the stranger operates the communication device 100, monitoring information including information indicating the location of the communication device 100 as observed when the out-of-area state began is transmitted to the registered transmission destination. It is thus possible to provide, without fail, the user (the legitimate user of the communication device 100) with information useful in the search for the communication device 100.

Here, with the configuration of this embodiment, when the user using the search app AP searches for and confirms the planned travel route, an area including the planned travel route is automatically set as the target area. That is, when a planned travel route (a route to a business trip destination) different from an existing planned travel route (a route that is used routinely) is searched for and confirmed, the monitoring processing is performed with an area including the other planned travel route as the target area. This eliminates the need for the user to separately perform an operation for setting the target area, and is thus user-friendly.

Some conventional communication devices are configured such that, when operated by a stranger, they transmit information on their location at that moment to a prescribed address (for example, the address of the legitimate owner of the communication devices). This permits the legitimate owner of such a communication device to search for it based on the location information.

However, with those conventional communication devices, unless a stranger operates them, their legitimate owner cannot obtain information on the location of the communication devices (cannot know the current location of their communication devices). Lack of location information on the communication devices makes it difficult to search for them.

By contrast, with the configuration of this embodiment, regardless of whether or not a stranger operates the communication device 100, monitoring information including information indicating the location of the communication device 100 as observed when the out-of-area state began is transmitted to the registered transmission destination. Thus, even if the stranger does not operate the communication device 100, the communication device 100 can be searched for easily.

Moreover, in this embodiment, as described above, when the location of the communication device 100 (own device) as recognized based on the GPS signals falls inside the first area A1 including the place of departure of the planned travel route, the controller 1 starts the monitoring processing. With this configuration, when the user arrives near the place of departure of the planned travel route (when the user is about to start traveling from the place of departure of the planned travel route to the destination), the monitoring processing is started automatically. This provides improved user-friendliness.

Furthermore, with this configuration, the monitoring processing is not started with the location of the communication device 100 falling outside the target area (an area including the first area A1). That is, for example, when a user is traveling from their home to the place of departure of the planned travel route, the monitoring processing is not performed. It is thus possible to prevent the monitoring processing from being performed unnecessarily.

Moreover, in this embodiment, as described above, when the out-of-area state has begun, the controller 1 makes the camera 6 perform shooting and includes shot data shot by the camera 6 in the monitoring information. With the monitoring information including shot data shot by the camera 6, when the communication device 100 is searched for based on the monitoring information, the communication device 100 can be searched for efficiently.

Moreover, in this embodiment, as described above, after the first transmission of monitoring information, if, based on the output of the movement detector 7, the controller 1 detects the communication device 100 (own device) having been moved, the controller 1 recognizes the location of the communication device 100 (own device) as observed when the communication device 100 (own device) was moved, and re-transmits monitoring information including the so recognized location to the registered transmission destination. Furthermore, at this time, the controller 1 makes the camera 6 perform shooting to acquire shot data shot by the camera 6 when the communication device 100 (own device) was moved, and includes the so acquired shot data in the monitoring information. This configuration provides increased information useful in the search for the communication device 100, and thus the communication device 100 can be searched for more efficiently.

Moreover, in this embodiment, as described above, when the out-of-area state has begun, the controller 1 shifts to the lock mode. With this configuration, it is possible to prevent the communication device 100 from unauthorized use by a stranger.

Reminding Function:

The communication device 100 is furnished with a reminding function. With the reminding function enabled, when the destination of the planned travel route is about to be reached, a notification to that effect is given to the user. The reminding function may be enabled automatically when the monitoring function is enabled.

For example, when the monitoring function is enabled, a setting screen (unillustrated) for the reminding function is displayed on the touch screen 3. The setting screen for the reminding function is a screen for accepting an operation for instructing whether to enable the reminding function.

When the touch screen 3 accepts an operation for instructing to enable the reminding function, the controller 1 enables the reminding function. Thereafter, the controller 1 recognizes the current location of the communication device 100 based on the GPS signals received by the GPS receiver 5, and when the so recognized current location of the communication device 100 falls inside the second area A2, the controller 1 determines that a notifying condition is satisfied.

On determining that the notifying condition is satisfied, the controller 1 performs at least one of first processing, second processing, and third processing. Of the first, second, and third processing, the processing that the controller 1 is made to perform as notifying processing can be set freely by the user. The first, second, and third processing may all be performed as the notifying processing.

In a case where a setting is made such that the first processing is performed, when the notifying condition is satisfied, the controller 1 makes the touch screen 3 display a notifying message to the effect that somewhere around the destination of the planned travel route has been reached. In a case where a setting is made such that the second processing is performed, when the notifying condition is satisfied, the controller 1 makes the vibration generator 8 drive (makes the communication device 100 vibrate). In a case where a setting is made such that the third processing is performed, when the notifying condition is satisfied, the controller 1 makes the sound outputter 9 output prescribed notifying sound.

With this configuration, when somewhere around the destination of the planned travel route is reached, a notification to that effect is given to the user. It is thus possible to prevent an inconvenience of the user missing their stop without noticing his arrival at the destination.

The embodiment disclosed herein should be considered in every aspect illustrative and not restrictive. The scope of the present disclosure is defined not by the description of the embodiment given above but by the appended claims, and encompasses every modification made in the sense and scope equivalent to those of the claims.

What is claimed is:

1. A communication device, comprising:
a storage that stores a search application for using a search service for searching for a route from a place of departure to a destination and that stores a planned travel route searched for and confirmed by a user using the search application;
a GPS receiver that receives a GPS signal;
a communicator for communication with outside; and
a controller
that sets an area including the planned travel route as a target area and
that performs monitoring processing for determining whether an out-of-area state has begun in which a location of the communication device as recognized based on the GPS signal falls outside the target area;
a movement detector that senses movement of the communication device; and
a camera,
wherein
when the out-of-area state has begun, the controller makes the camera perform shooting, and
transmits monitoring information including
information indicating the location of the communication device as observed when the out-of-area state began, and
shot data shot by the camera when the out-of-area state began
via the communicator to a transmission destination previously registered by the user,
after transmitting the monitoring information, the controller shifts to a lock mode in which the controller limits use of the communication device,
after shifting to the lock mode, until a prescribed ending condition is satisfied, every time the controller detects that the communication device has been moved based on an output of the movement detector, the controller makes the camera perform shooting and
transmits monitoring information for re-transmission including
information indicating the location of the communication device as observed when the communication device was moved, and
shot data shot by the camera when the communication device was moved
via the communicator to the transmission destination, and
the controller
sets as a first area an area inside a circle with a center at the place of departure of the planned travel route and with a radius equal to a predetermined distance,
sets as a second area an area inside a circle with a center at the destination of the planned travel route and with a radius equal to the predetermined distance,
sets as a third area an area defined between first line data obtained by shifting the planned travel route by the predetermined distance in one direction and second line data obtained by shifting the planned travel route by the predetermined distance in another direction opposite to the one direction, and
sets the first, second, and third areas as the target area.

2. The communication device according to claim 1, wherein
the controller starts the monitoring processing when the location of the communication device falls inside the first area.

3. The communication device according to claim 1, wherein
when a prescribed unlocking condition is satisfied when the controller is operating in the lock mode, the controller shifts from the lock mode to a normal mode.

4. The communication device according to claim 1, further comprising:
a notifier,
wherein
the controller makes the notifier give a notification when the location of the communication device falls in the second area.

* * * * *